United States Patent
Dierauer et al.

(10) Patent No.: US 6,959,403 B2
(45) Date of Patent: Oct. 25, 2005

(54) FAULT LOCALIZATION AND HEALTH INDICATION FOR A CONTROLLER AREA NETWORK

(75) Inventors: Peter P. Dierauer, Freeport, IL (US); Isabelle Dierauer, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 84 days.

(21) Appl. No.: 10/185,925

(22) Filed: Jun. 26, 2002

(65) Prior Publication Data

US 2002/0166088 A1    Nov. 7, 2002

Related U.S. Application Data

(62) Division of application No. 09/461,662, filed on Dec. 14, 1999, now Pat. No. 6,442,708.

(51) Int. Cl.[7] .............................................. H02H 3/05
(52) U.S. Cl. .......................................... 714/49; 714/47
(58) Field of Search ......................... 714/706, 25, 708, 714/49, 47; 370/525; 709/224, 225; 707/10; 375/220; 345/734, 764

(56) References Cited

U.S. PATENT DOCUMENTS

| | | | |
|---|---|---|---|
| 4,462,099 A | * | 7/1984 | Braun .......................... 714/706 |
| 4,887,262 A | | 12/1989 | van Veldhuizen |
| 4,947,459 A | | 8/1990 | Nelson et al. |
| 4,979,171 A | * | 12/1990 | Ashley ......................... 370/525 |
| 5,001,642 A | | 3/1991 | Botzenhardt et al. |
| 5,111,460 A | * | 5/1992 | Botzenhardt et al. ........ 714/708 |
| 5,157,667 A | | 10/1992 | Carusone, Jr. et al. |
| 5,303,348 A | | 4/1994 | Botzenhardt et al. |
| 5,309,448 A | | 5/1994 | Bouloutas et al. |
| 5,396,357 A | | 3/1995 | Goossen et al. |
| 5,448,561 A | | 9/1995 | Kaiser et al. |
| 5,452,201 A | | 9/1995 | Pieronek et al. |

(Continued)

FOREIGN PATENT DOCUMENTS

DE    44 21 304 A1    12/1995

(Continued)

OTHER PUBLICATIONS

IBM, Good/Bad Counter Handling, IBM Disclosure Bulletin, Apr. 1986, vol. 28, pp. 4741-4742.*

*Primary Examiner*—David Ton
(74) *Attorney, Agent, or Firm*—Schiff Hardin LLP; Trevor B. Joike

(57) ABSTRACT

A node of a network comprises an error message detector arranged to detect error messages transmitted over the network, a counter arranged to count the error messages in order to produce an error message count, and a controller arranged to count valid messages in order to produce a count of valid messages. The controller is arranged to compare the error message count to the valid message count to indicate the health of the network. The node further comprises a transceiver, a controller coupled to the transceiver by a receive line and a transmit line, and error message first logic coupled to the receive and transmit lines. The error message first logic is arranged to detect a first error message from the receive line and a second error message from the transmit line, and to determine whether the node is closest to a fault by comparing timing between the first error message and the second error message.

23 Claims, 3 Drawing Sheets

U.S. PATENT DOCUMENTS

| | | | |
|---|---|---|---|
| 5,469,150 A | 11/1995 | Sitte | |
| 5,483,637 A | 1/1996 | Winokur et al. | |
| 5,551,053 A | 8/1996 | Nadolski et al. | |
| 5,574,848 A | 11/1996 | Thomson | |
| 5,600,706 A | 2/1997 | Dunn et al. | |
| 5,600,782 A | 2/1997 | Thomson | |
| 5,758,288 A | 5/1998 | Dunn et al. | |
| 5,912,921 A * | 6/1999 | Warren et al. | 375/220 |
| 6,054,987 A * | 4/2000 | Richardson | 345/734 |
| 6,112,239 A * | 8/2000 | Kenner et al. | 709/224 |
| 6,154,744 A * | 11/2000 | Kenner et al. | 707/10 |
| 6,271,845 B1 * | 8/2001 | Richardson | 345/764 |
| 6,308,282 B1 | 10/2001 | Huang et al. | |
| 6,353,902 B1 * | 3/2002 | Kulatunge et al. | 714/712 |
| 6,421,726 B1 * | 7/2002 | Kenner et al. | 709/225 |

FOREIGN PATENT DOCUMENTS

| | | |
|---|---|---|
| DE | 299 08 481 U1 | 9/1999 |
| WO | WO 98/53581 | 11/1998 |
| WO | WO 99/19782 | 4/1999 |
| WO | WO 99/49680 | 9/1999 |
| WO | WO 00/04427 | 1/2000 |

* cited by examiner

FAULT LOCALIZATION AND HEALTH INDICATION FOR A CONTROLLER AREA NETWORK This application is a divisional application of application Ser. No. 09/461,662, filed on Dec. 14, 1999 now U.S. Pat. No. 6,442,708.

TECHNICAL FIELD OF THE INVENTION

The present invention relates to localization of faults in a controller area network and to the indication of the health of the controller area network.

BACKGROUND OF THE INVENTION AND PRIOR ART

Localization of faults in the physical layer of current industrial and other networks is a substantial problem. Such networks can extend over several hundred feet, can typically have more than 300 connection points, and can have 50 or more nodes. Faults in a network include, for example, bad or intermittent contacts, loose connections, broken wires, bad soldering, a failed transceiver or controller, a wet cable, EMI interference, and/or the like.

Because faults can occur at any location within a network, geographic localization of faults can be frequently difficult. Currently, even when it is possible to find a fault, finding its cause requires the investment of substantial time.

Moreover, as discussed above, some faults are intermittent, while other faults develop slowly over time. These types of network faults result in erratic network behavior, and they have no clear indications of cause. The diagnosis of such faults is, in general, very difficult.

The present invention is directed to an arrangement which addresses one or more of these problems.

SUMMARY OF THE INVENTION

In accordance with one aspect of the present invention, a method of determining health of a network comprises the following steps: a) determining a number of error messages transmitted over the network; b) determining a number of valid messages transmitted over the network; and, c) comparing the number of error messages to the number of valid messages in order to determine the health of the network.

In accordance with another aspect of the present invention, a node of a network comprises an error message detector arranged to detect error messages transmitted over the network, a counter arranged to count the error messages in order to produce an error message count, and a controller arranged to produce a count of valid messages and to compare the error message count to the valid message count.

In accordance with yet another aspect of the present invention, a method of determining a location of a fault comprises the following steps: a) detecting a first error message from a receive line of a node; b) detecting a second error message from a transmit line of the node; c) if the first error message is detected before the second error message, determining that the node did not first transmit the second error message; and, d) if the second error message is detected before the first error message, determining that the node may have first transmitted the second error message.

In accordance with still another aspect of the present invention, a node comprises a transceiver coupled to a communication line, a controller coupled to the transceiver by a receive line and a transmit line, and error message first logic coupled to the receive and transmit lines. The error message first logic is arranged to detect a first error message from the receive line and a second error message from the transmit line, and the error message first logic is further arranged to determine whether the node is closest to a fault by comparing timing between the first error message and the second error message.

BRIEF DESCRIPTION OF THE DRAWINGS

These and other features and advantages of the present invention will become more apparent from a detailed consideration of the invention when taken in conjunction with the drawings in which.

DESCRIPTION OF THE PREFERRED EMBODIMENT

The features and functionality of an exemplary controller area network are described in detail in ISO standard 11989. In relation to the present invention, this controller area network has a defined error handling and message repetition mechanism. This mechanism includes the generation of Error Frames.

Basically, all nodes in a controller area network detect and interpret the bit stream on the network's communication lines. When a controller of the network identifies an error (i.e., a fault), that controller will immediately cause the transmission of an error message. This error message is referred to in the above mentioned standard as an Error Frame. Error types and detailed specifications of error conditions are described in the standard. An Error Frame is defined in the standard as seven dominant bits. Seven dominant bits are seven bits that are transmitted in succession and that all have the same bit value. The standard otherwise prohibits the transmission of more than six bits in a row all having the same bit value. Error Frames are able to overwrite all other potential transmissions in the network.

A fault in the physical layer of a controller area network results in the interference with, or the destruction of, messages on the network. When messages are not properly received, the controllers of the nodes in the network detect such improper messages with the result that these nodes transmit Error Frames indicating that the nodes have detected a fault. The present invention utilizes the fact that there is a direct relation between the number of Error Frames transmitted in a controller area network and the intensity of a physical related problem.

Due to the error mechanism in a controller area network, the network is able to survive a certain amount of disruption before the network becomes unstable or exhibits intolerable message delays. In a healthy network, the ratio between the number of Error Frames and the number of valid messages is stable and is usually almost 0%. However, as problems in the physical layer increase, so does the ratio between the number of Error Frames and the number of valid messages. Therefore, in accordance with the present invention, the health of a network can be determined by determining, monitoring, and/or analyzing the Error-Frame-to-valid-message ratio.

Figure 1:
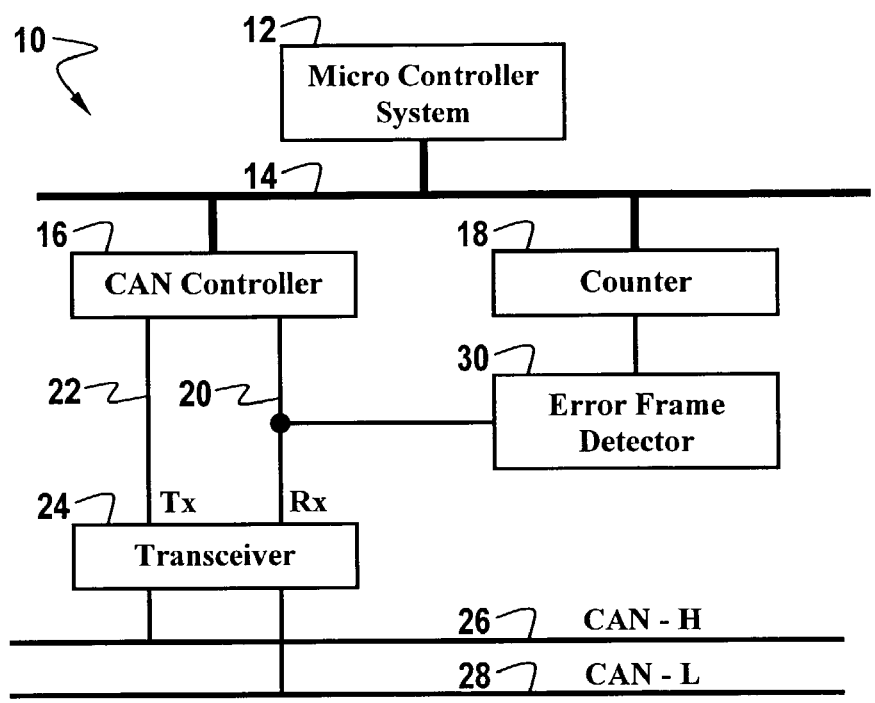
FIG. 1 illustrates a node of a controller area network in accordance with an embodiment of the present invention.

All, or nearly all, of the commercially available controllers that can be used in a controller area network are able to monitor the message traffic on the network. Therefore, one way to determine the Error-Frame-to-valid-message ratio is for the controller of a node to count each type of message and to divide the number of Error Frames by the number of valid messages over a given period of time. A node 10 shown in FIG. 1 of a network such as that of FIG. 2 may be arranged to determine this ratio.

The node 10 includes a micro controller system 12 that is coupled to a bus 14. A controller 16 and an Error Frame counter 18 are also coupled to the bus 14. The controller 16 is coupled over receive and transmit lines 20 and 22 to a transceiver 24 which in turn is coupled to communication lines 26 and 28 that couple the node 10 with other nodes in a controller area network. An Error Frame detector 30 is coupled between the Error Frame counter 18 and the receive line 20. The micro controller system 12 is responsible for the functioning of the node and, among other functions, supplies addresses and data to the controller 16 for supply over the communication lines 26 and 28 and processes data received over the communication lines 26 and 28.

When a message is to be transmitted over the communication lines 26 and 28 to another node, the controller 16 supplies the message over the transmit line 22 to the transceiver 24 and the transceiver 24 transmits the message. Similarly, when a message is received by the transceiver 24 from another node over the communication lines 26 and 28, the transceiver 24 supplies the received message over the receive line 20 to the controller 16. When the received message is an Error Frame, the Error Frame detector 30 detects the received Error Frame and causes the Error Frame counter 18 to count one Error Frame.

The controller 16 maintains a count of all messages received during the time between resets of the Error Frame counter 18. At the time that the controller 16 determines the Error-Frame-to-valid-message ratio, the controller 16 reads the count accumulated by the Error Frame counter 18, subtracts this count from the total count accumulated by the controller 16 during the same time interval in order to produce a valid message count, and then divides the Error Frame count by the valid message count in order to calculate the ratio. The controller 16 then resets the Error Frame counter 18 to begin the next time interval. The ratio thus calculated is a good indication of the health of the network to which the node 10 is coupled. The controller 16 can also monitor the ratio over a plurality of time intervals in order to determine the trend in the health of the network.

Alternatively, the controller 16 can itself detect Error Frames and can internally maintain both the total message count and the Error Frame count so that the counter 18 and the Error Frame detector 30 are not needed as elements separate from the controller 16. As a still further alternative, logic can be provided in the controller 16 or elsewhere in the node 10 that distinguishes between valid messages and Error Frames so that separate counts, one for Error Frames and one for messages, can be maintained. Accordingly, the need to subtract an Error Frame count from a total message count in order to determine a valid message count is avoided.

Although the arrangement described above provides a good indication of the health of a network, it does not provide any information about the geographical location of the cause of a fault. In order to determine the geographical location of a fault, it may be noted that signals require time to propagate through a network. Although different media have different propagation delays, the maximum speed of a signal is the speed of light. Therefore, the speed of propagation of a signal in a network can be used to determine location of a fault for any transmission medium such as fiber optics, RF, copper wires, etc.

If a fault such as an interruption occurs in a controller area network, the node that is closest to the fault is the first node to discover the fault. This node discovers the fault when messages on the network contain interference or are destroyed. The node that first discovers a fault is the first node to generate and transmit an Error Frame.

Figure 2:
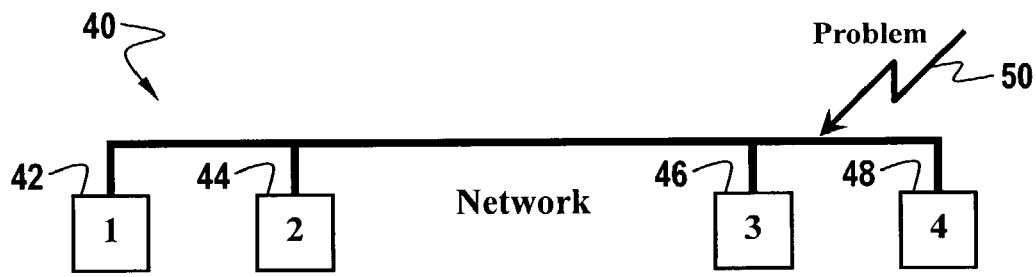
FIG. 2 illustrates a controller area network having a plurality of nodes each of which may be arranged in accordance with the node illustrated in FIG. 1 or the node illustrated in FIG. 4.
Figure 3:
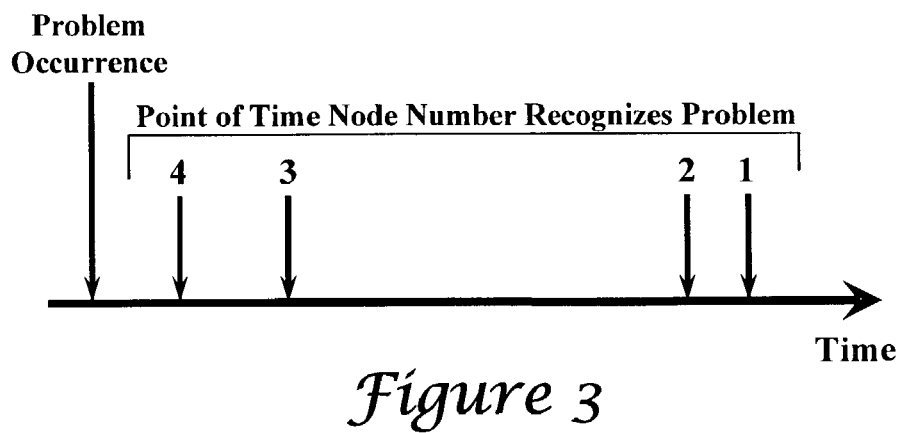
FIG. 3 is an illustrative timing diagram useful in explaining the recognition of a fault (problem) that is indicated in FIG. 2.

A fault (problem) in a controller area network is illustrated in FIG. 2. Specifically, a controller area network 40 includes nodes 42, 44, 46, and 48. A fault 50 has occurred at a location between the nodes 46 and 48 and is closer to the node 48 than to the node 46. FIG. 3 is a time line that shows the occurrence of the fault 50 and the relative times at which the nodes 42, 44, 46, and 48 discover the fault 50. As can be seen from FIG. 3, the node 48 discovers the fault 50 first because it is closest to the fault 50, the node 46 discovers the fault 50 second because it is next closest to the fault 50, and so on.

Figure 4:
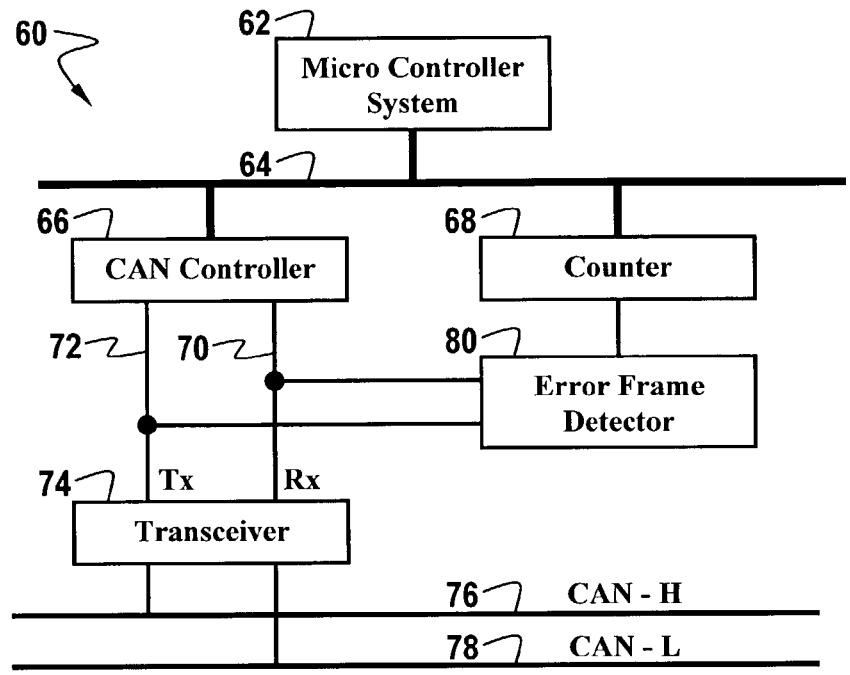
FIG. 4 illustrates a node of another controller area network in accordance with another embodiment of the present invention.

As shown in FIG. 4, a node 60 is arranged to determine whether it is the first node to discover a fault. The node 60 includes a micro controller system 62 that is coupled to a bus 64. A controller 66 and a counter 68 are also coupled to the bus 64. The controller 66 is coupled over receive and transmit lines 70 and 72 to a transceiver 74 which in turn is coupled to communication lines 76 and 78 that couple the node 60 with other nodes in a controller area network. An Error Frame first logic 80 is coupled between the counter 68 and the receive and transmit lines 70 and 72.

The Error Frame first logic 80 analyzes the bit streams on the receive and transmit lines 70 and 72 in order to detect Error Frames thereon. Error Frames can occur on either or both of the receive and transmit lines 70 and 72. Because there can be superposition on the communication lines 76 and 78, the leading edge of the Error Frame should be monitored. In most cases, it is sufficient to monitor only the leading edge of the Error Frame because the transceiver delay of the different nodes are very similar.

Thus, if the leading edge of an Error Frame appears on the receive line 70 before the leading edge of an Error Frame appears on the transmit line 72, the Error Frame first logic 80 determines that the node 60 has detected the fault after another node detected that fault. Therefore, the node 60 cannot be the first node to have transmitted the Error Frame. On the other hand, if the leading edge of an Error Frame appears on the transmit line 72 before the leading edge of an Error Frame appears on the receive line 70, the Error Frame first logic 80 determines that the node 60 has detected the fault before another node detected that fault. Therefore, the node 60 is the first node to have transmitted the Error Frame.

In cases where the transceivers of the various nodes of a network have different delay times, the decision process can be enhanced by analyzing the time delay between the leading edges of the Error Frames that appear on the receive and transmit lines 70 and 72. Thus, the Error Frame first logic 80 determines whether its corresponding node is the first to transmit an Error Frame by determining the time difference between the leading edges of the Error Frames appearing on the receive and transmit lines 70 and 72 and, when appropriate, by comparing this time difference to the transceiver delay. The transceiver delay is the time required for a node which receives a message from the communication lines 76 and 78 to pass that message to the receive line 70.

Figure 5:
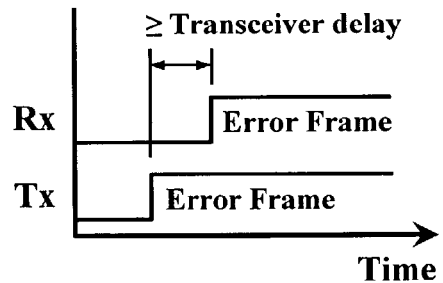
FIGS. 5–7 are illustrative timing diagrams useful in explaining fault localization performed by the node of FIG. 4; and, FIG. 8 is a node diagram useful in explaining the present invention.
Figure 6:
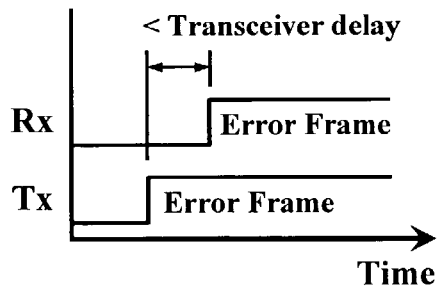
Figure 7:
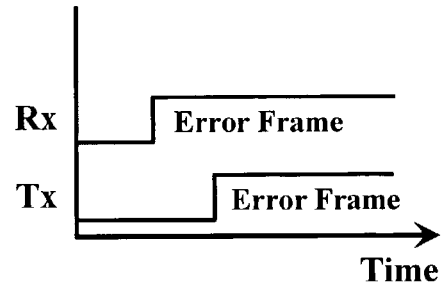

FIGS. 5–7 illustrate the logic that is implemented by the Error Frame first logic 80. FIG. 5 shows the case where an Error Frame appears on the transmit line 72 and an Error Frame subsequently appears on the receive line. In this case, because the difference in time between when the leading edge of an Error Frame appears on the transmit line 72 and when the leading edge of an Error Frame subsequently appears on the receive line 70 is greater than or equal to the transceiver delay, the Error Frame first logic 80 determines that the node 60 first transmitted the Error Frame. Therefore, the Error Frame first logic 80 determines that the node 60 discovered the fault before any other node discovered that fault such that this fault is closest to the node 60.

FIG. 6 also shows the case where the leading edge of an Error Frame appears on the transmit line 72 and where the leading edge of an Error Frame subsequently appears on the receive line 70. In the case of FIG. 6, however, because the difference in time between when the leading edge of the Error Frame appears on the transmit line 72 and when the leading edge of an Error Frame subsequently appears on the receive line 70 is less than the transceiver delay, the Error Frame first logic 80 determines that the node 60 has discovered the fault after another node discovered that fault. Therefore, the node 60 cannot be the first node to have transmitted the Error Frame.

FIG. 7 shows the case where the leading edge of an Error Frame appears on the receive line 70 before the leading edge of an Error Frame appears on the transmit line 72. In this case, the Error Frame first logic 80 also determines that the node 60 has discovered the fault after another node discovered that fault. Therefore, the node 60 cannot be the first node to have transmitted the Error Frame.

The node that determines that it is the first to detect a fault can transmit a message to that effect over the network. This message can be used by all nodes to determine the node that is closest to a fault.

Figure 8:
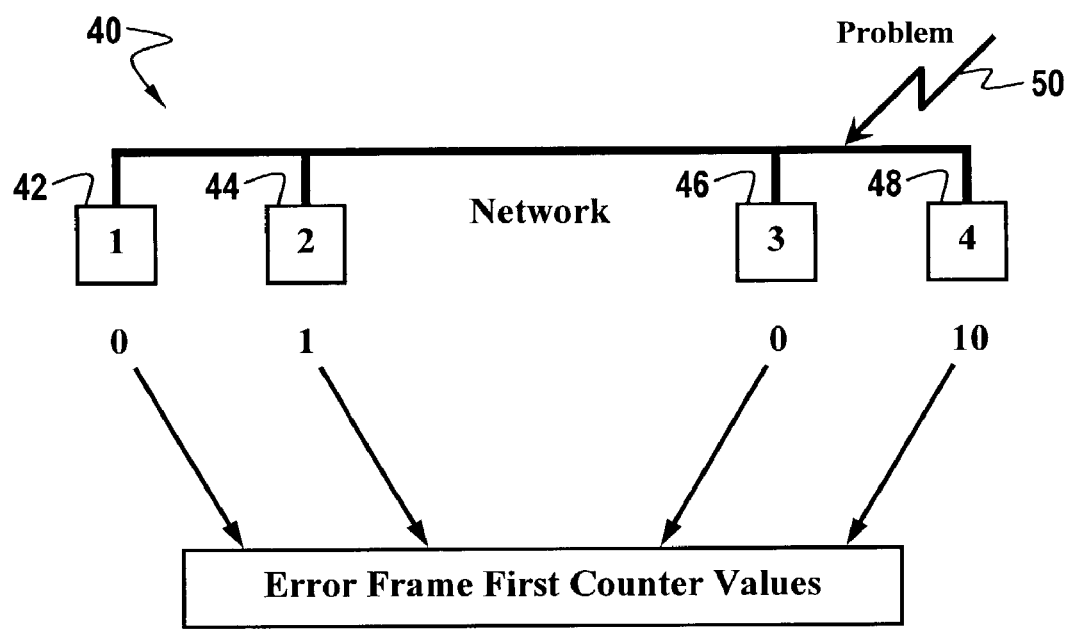

Moreover, it is possible for a node to incorrectly determine that it is the first node to detect a fault and to transmit an Error Frame. In this case, a node may incorrectly notify the network that it is the first node to detect a fault. In this regard, it is noted that a fault may continually interfere with messages on the network so that the nodes of the network will repeatedly detect bad messages and, as a result, will repeatedly transmit Error Frames. Therefore, the counter 68 of each node is arranged to count the number of times that the Error Frame first logic 80 first detects an Error Frame. In this case, each node may transmit its count over the network so that all nodes can determine, from the node having the highest count, which node is closest to the fault. Alternatively, only the node that has a count exceeding a predetermined threshold need transmits a message that it is the node closest to the fault. FIG. 8 shows an example where the node 48 has produced a much higher count that has any of the other nodes.

Certain modifications of the present invention have been discussed above. Other modifications will occur to those practicing in the art of the present invention. For example, Error Frames are detected and counted by the Error Frame detector 30 and the counter 18. Instead, other elements, either internal or external to the controller 16, may be used to detect and/or count Error Frames.

Moreover, the present invention has been described above in connection with controller area networks. A controller area network may be a Smart Distributed System, a DeviceNet, a CAN open or Pilz Safety bus, etc. The present invention may also be used with other networks.

Furthermore, as described above, Error Frames are detected in order to determine the health of a network or the geographic location of a fault. Instead, other types of error messages may instead be used to determine the health of a network or the geographic location of a fault.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of determining health of a network comprising the following steps:
    a) determining a number of error messages transmitted over the network;
    b) determining a number of valid messages transmitted over the network; and,
    c) comparing the number of error messages to the number of valid messages in order to determine the health of the network.

2. The method of claim 1 wherein valid messages are nonerror messages.

3. The method of claim 1 wherein step b) comprises the following steps:
    b1) determining a number of all messages; and,
    b2) subtracting the number of error messages from the number of all messages.

4. The method of claim 1 wherein step c) comprises the step of calculating a ratio between the number of error messages and the number of valid messages.

5. The method of claim 4 wherein step b) comprises the following steps:
    b1) determining a number of all messages; and,
    b2) subtracting the number of error messages from the number of all messages.

6. The method of claim 4 wherein the step of calculating the ratio comprises the step of dividing the number of error messages by the number of valid messages.

7. The method of claim 6 wherein step b) comprises the following steps:
    b1) determining a number of all messages; and,
    b2) subtracting the number of error messages from the number of all messages.

8. The method of claim 4 comprising the further step of calculating the ratio over a plurality of time intervals and monitoring a trend of the ratios.

9. The method of claim 1 further comprising the following steps:
    d) repeating steps a)–c) over a plurality of time intervals; and,
    e) monitoring a trend of the health of the network based upon results from step d).

10. The method of claim 1 wherein each of the error messages contains a bit sequence which uniquely identifies the error message as an error message.

11. The method of claim 10 wherein the bit sequence comprises bits all have the same value.

12. A node of a network comprising:
an error message detector arranged to detect error messages transmitted over the network;
a counter arranged to count the error messages in order to produce an error message count; and,
a controller arranged to produce a count of valid messages and to compare the error message count to the valid message count so as to determine the health of the network.

13. The node of claim 12 wherein valid messages are non-error messages.

14. The node of claim 12 wherein the error message detector and the counter are part of the controller.

15. The node of claim 12 wherein the controller is further arranged to determine an all message count and to subtract the error message count from the all message count in order to produce the valid message count.

16. The node of claim 12 wherein the controller is arranged to calculate a ratio between the error message count and the valid message count.

17. The node of claim 16 wherein the controller is arranged to calculate the ratio over a plurality of time intervals and to monitor a trend of the ratios.

18. The node of claim 16 wherein the controller is further arranged to determine an all message count and to subtract the error message count from the all message count in order to produce the valid message count.

19. The node of claim 16 wherein the controller is arranged to calculate the ratio by dividing the error message count by the valid message count.

20. The node of claim 19 wherein the controller is arranged to determine an all message count and to subtract the error message count from the all message count in order to produce the valid message count.

21. The node of claim 12 wherein the controller is arranged to calculate a ratio between the error message count and the valid message count over a plurality of time intervals and to monitor a trend of the health of the network based upon the ratios.

22. The node of claim 12 wherein each of the error messages contains a bit sequence which uniquely identifies the error message as an error message.

23. The method of claim 22 wherein the bit sequence comprises bits all have the same value.

\* \* \* \* \*